United States Patent [19]

Arikawa

[11] Patent Number: 4,872,729

[45] Date of Patent: Oct. 10, 1989

[54] ANTI-SKID CONTROL APPARATUS FOR A VEHICLE BRAKING SYSTEM

[75] Inventor: Tetsuro Arikawa, Kanagawa, Japan

[73] Assignee: Nippon ABS, Ltd., Japan

[21] Appl. No.: 97,879

[22] Filed: Sep. 17, 1987

[30] Foreign Application Priority Data

Sep. 19, 1986 [JP] Japan .................................. 61-221033

[51] Int. Cl.$^4$ ............................. B60J 8/82; B60J 8/64
[52] U.S. Cl. ...................................... 303/92; 303/111; 303/115
[58] Field of Search ................ 303/9.63, 111, 92, 115, 303/119, 113, 114

[56] References Cited

U.S. PATENT DOCUMENTS

| 3,674,317 | 9/1972 | Mangold | 303/118 |
| 3,907,377 | 9/1975 | Mayer | 303/119 |
| 3,980,346 | 9/1976 | Leiber | 303/115 |
| 4,033,637 | 7/1977 | Leiber | 303/115 |
| 4,229,049 | 10/1980 | Ando | 303/9.63 |
| 4,418,966 | 12/1983 | Hattwig | 303/100 |
| 4,421,362 | 12/1983 | Shirai et al. | 303/115 |
| 4,480,876 | 11/1984 | Sato et al. | 303/111 X |
| 4,547,022 | 10/1985 | Brearley et al. | 303/111 |
| 4,637,664 | 1/1987 | Arikawa | 303/111 |
| 4,640,557 | 2/1987 | Panizza et al. | 303/111 X |
| 4,733,921 | 3/1988 | Farr | 303/111 |
| 4,740,040 | 4/1988 | Arikawa | 303/111 |

FOREIGN PATENT DOCUMENTS

| 008257 | 4/1986 | Japan | 303/92 |
| 0178255 | 8/1986 | Japan | 303/111 |
| 2162267 | 1/1986 | United Kingdom | 303/111 |

*Primary Examiner*—Andres Kashnikow
*Assistant Examiner*—Matthew C. Graham

*Attorney, Agent, or Firm*—Jones, Day, Reavis, and Pogue

[57] ABSTRACT

In an anti-ski control apparatus for a vehicle braking system including fluid pressure control valve devices and a valve apparatus, when brake-relieving output signals are obtained from both rear wheels, the brake-relieving output signal of the one of the rear wheels that is obtained later than that of the other is combined logically with the brake-relieving output signal of the one of the front wheels running on the same side as the one rear wheels to form a brake-relieving control signal for controlling a first or second fluid pressure control valve device connected to the wheel cylinder of the one front wheel. A brake-increasing control signal is generated by the first or second fluid pressure control valve device after the brake-relieving control signal disappears based on the brake-increasing output signal of the one of the front and rear wheels on the same side which has a stronger locking tendency than the other. In the alternative, the signal is formed based on the brake-increasing output signal of the one of the front and rear wheels on the same side, the acceleration of which is smaller than that of the other. A brake-holding control signal by the first or second fluid pressure control valve device, before the brake-relieving control signal generates, is formed by logical sum (OR) of the brake-holding output signals of the one front and rear wheels on the same side, and a brake-increasing control signal by the first or second fluid pressure control valve device, after the brake-relieving control signal disappears, is formed on the basis of the brake-increasing output signal of the one of the one front and rear wheels on the same side the brake-holding output signal of which has generated sooner than that of the other.

14 Claims, 8 Drawing Sheets

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle braking system which can prevent locking of the wheels.

2. Description of the Prior Art

A well-known anti-skid control apparatus for a vehicle braking system includes a fluid pressure control valve device arranged between a master cylinder and a wheel cylinder of a brake for the wheel, the fluid pressure control valve device receiving control signals from a control unit that measures the skid condition of the wheel to control brake fluid pressure to the wheel cylinder. A hydraulic reservoir receives brake fluid discharged through the fluid pressure control valve device from the wheel cylinder when the device decreases brake fluid pressure to the wheel cylinder, a pressure fluid supply conduit connects the master cylinder with the fluid pressure control valve device, and a fluid pump returns the brake fluid from the hydraulic reservoir into the pressure fluid supply conduit.

When the fluid pressure control valve device is provided for each of the four wheels, and their fluid pressure is independently controlled, there is no problem of control. When the fluid pressure control valve device is provided for each of the front wheels, and for both rear wheels in common, there is also no problem of control. In the latter case, the one common fluid pressure control valve device is controlled on the basis of the lower of the speeds of the rear wheels. However, in the above cases, three or four fluid pressure control valve devices are used. Accordingly, the whole anti-skid control apparatus is large and very heavy. Since each fluid pressure control valve device is expensive, the system is expensive.

Suppose the brake fluid pressures of the front wheels are controlled by two fluid pressure control valve devices in the diagonal or X-type conduit system, and the brake fluid pressures of the rear wheels are controlled together with the front wheels. When the vehicle runs on the right and left sides a road on which are considerably different in frictional coefficient, there is the danger that the one rear wheel that is diagonally opposite to the one front wheel on the higher frictional coefficient side will become locked. In that case, steering of the vehicle becomes unstable. That is very dangerous.

Further, suppose that proportioning valves are provided for the rear wheels. The brake fluid pressures of the rear wheels increase in proportion to the input fluid pressures to the proportioning valves. There is danger of locking.

Accordingly, in order to provide an anti-skid control apparatus for a vehicle braking system which can be small and light, and can minimize the danger of locking of the rear wheels, this applicant previously proposed an anti-skid control apparatus for a vehicle braking system which includes a fluid pressure control valve device arranged between a master cylinder and a wheel cylinder of a brake for the wheel, the fluid pressure control valve device receiving control signals from a control unit measuring the skid condition of the wheel to control the brake fluid pressure to the wheel cylinder. A hydraulic reservoir which, when the brake fluid pressure to the wheel cylinder is decreased with control of the fluid pressure control valve device, stores the brake fluid discharged through the fluid pressure control valve device from the wheel cylinder. A pressure fluid supply conduit connects the master cylinder with the fluid pressure control valve device, and a fluid pump returns the brake fluid from said hydraulic reservoir into said pressure fluid supply conduit. The fluid pressure control valve devices are provided for a pair of front wheels, respectively, and a valve apparatus receiving fluid pressures of wheel cylinders of said front wheels is arranged between the pair of front wheels and a pair of rear wheels. When any one of the fluid pressure control valve devices starts to control the fluid pressure of at least the one of the rear wheels, thats at the same side as the one of the front wheels, the fluid pressure of the wheel cylinder which is lower than that of the other is controlled in accordance with the lower of the fluid pressures of the wheel cylinders of the front wheels by the valve apparatus.

In the above-described anti-skid control apparatus, the control signals of the control unit are formed by determining the skid conditions of the respective front wheels. On the assumption that the front and rear wheels are provided with tires of the same kind, the braking forces are so distributed to the wheels that the front wheels tend to lock sooner than the rear wheels, when the vehicle is rapidly braked on a road which is uniform in frictional coefficient.

However, when the above assumption is not fulfilled, as for example, when only the front wheels are provided with spiked tires or chains for running on snowy or icy road, and the rear wheels are provided with normal tires, the rear wheels tend to lock sooner than the front wheels. In the above anti-skid control apparatus, the brake fluid pressure is not controlled when the rear wheel locks. When the brake fluid pressure of the front wheel is higher than the limit locking pressure of the rear wheel, the the rear wheel is not unlocked and so steering stability cannot be maintained.

Even when the front and rear wheels are provided with tires of the same kind, the rear wheel may tend to lock sooner than the front wheel when the front wheel brakes fade, causing the limit lock pressure of the front wheel to become excessively high. This is particularly likely when the vehicle is rapidly braked on a high road. When a proportioning valve is used, the fluid pressure at the rear wheel is lower than that of the front wheel. However, the pressure at the rear wheel increases in proportion to the fluid pressure of the front wheel, and reaches the limit lock pressure. The above described problem occurs.

FIG. 1 shows the problem described above. FIG. 1A shows the changes of the wheel speeds during the time when the vehicle is braked. FIG. 1B shows the control signals of the control unit, and FIG. 1C shows the changes of the brake fluid pressures of the wheels.

When the front and rear wheels are provided with tires of the same kind, and they run on the road having a uniform frictional coefficient, the brake fluid pressures P and P' of the front and rear wheels change with time, as shown by the solid lines in FIG. 1C, when the brake pedal is depressed at time t0. The control unit generates a brake maintaining instruction at time t1. The fluid pressure control valve device comprises an inlet valve and an outlet valve. The control signals consist of signals EV and AV for the inlet and outlet valves respectively.

Although AV is still "0", EV becomes "1" at time t1. Thus, the brake fluid pressure P of the front wheel is held constant. The control unit generates a brake relieving instruction at time t2. Thus, EV is still "1", and AV change from "0" to "1". As shown in FIG. 1C, the brake fluid pressure P of the front wheel decreases. AV becomes "0" at time t3, while EV is still "1". Thus, the brake fluid pressure is held constant.

EV becomes "0" at time t4. The brake fluid pressure rises again. EV again becomes "1" at time t5. The brake fluid pressure is held constant. Hereafter, the brake pressure P increases in steps as described above. AV becomes "1" at time t6, while EV is "1". Accordingly, the brake fluid pressure P decreases.

In the manner described above, the brake fluid pressure P of the front wheel changes with time. The brake fluid pressure P' of the rear wheel is reduced by the proportioning valve and also changes with time in accordance with the brake pressure P of the front wheel. The proportioning valve causes a hysteresis phenomenon by which the brake fluid pressure P' of the rear wheel changes a little later than that P of the front wheel. However, this time lag is neglected in FIG. 1C.

Generally, a larger amount of brake fluid is required for a constant increase of brake fluid pressure in the lower pressure range under the influence of rigidity of the wheel cylinder in the rear wheel brake apparatus. Accordingly, the change range of the brake fluid pressure P' of the rear wheel is less than that of the front wheel, as shown in FIG. 1C.

The wheel speeds V and V' of the front and rear wheels change with time, as shown by the solid lines in FIG. 1A, in accordance with the above described changes of the brake fluid pressures. This provides effective anti-skid control, decreasing wheel speeds without locking the wheels.

However, when only the front wheels are provided with chains, or when the front brakes fade the limit lock pressure of the front wheel is increased. In this case, the brake fluid pressure P of the front wheel changes with time, as shown by dashed-lines in FIG. 1A. The pressure rises above the level of the brake fluid pressure shown by the solid line. On the other hand, the brake fluid pressure P' of the rear wheel changes beyond the rear limit lock pressure R, as shown by the dashed line. Hereafter, even when the brake fluid pressure P of the front wheel is decreased, the rear wheel cannot be prevented from locking, partly because the range of the change of the brake fluid pressure P' is less. The front wheel is prevented from locking, as shown by the dashed line in FIG. 1A but, the rear wheel is locked. The anti-skid control is not effective and steering stability is lost. This is very dangerous situations.

SUMMARY OF THE INVENTION

Accordingly, it is an object of this invention to provide an anti-skid control apparatus for a vehicle braking system which can be small-sized and light, and can minimize the danger of locking the rear wheels during braking.

In accordance with an aspect of this invention, an anti-skid control apparatus for a vehicle braking system includes a pair of front wheels, and a pair of rear wheels in which wheel cylinders are diagonally connected in conduits and a first fluid pressure control valve device for controlling the brake fluid pressure of the wheel cylinder of one of the front wheels, arranged between a first fluid pressure generating chamber of a tandem master cylinder and the wheel cylinder of the one front wheel. A second fluid pressure control valve device for controlling the brake fluid pressure of the wheel cylinder of another of the front wheels is arranged between a second fluid pressure generating chamber of the tandem master cylinder and the wheel cylinder of the other front wheel. A control unit measures the skid conditions of the front and rear wheels and generates instructions for controlling the first and second fluid pressure control valve devices and a valve apparatus generates a fluid pressure in accordance with the lower of the brake fluid pressures of the front wheels controlled by the first and second fluid pressure control valve devices is arranged between the wheel cylinders of the front wheels and those of the rear wheels.

When a braking-relieving output signal for decreasing the brake fluid pressure is obtained from only one of the rear wheels, the signal is ignored, and when brake-relieving output signals are obtained from both of the rear wheels, the brake-relieving output signal of the one of the rear wheels that is obtained later than that of the other is combined logically with the brake-relieving output signal of the one of the front wheels running on the same side as the one of the rear wheels to form a brake-relieving control signal for controlling the first or second fluid pressure control valve device connected to the wheel cylinder of the one front wheel. A brake-increasing control signal for increasing the brake fluid pressure by the first or second fluid pressure control valve device, after the brake-relieving control signal disappears, is formed on the basis of the brake-increasing output signal of the one of the one front and rear wheels on the same side which has more of a tendency to lock than the other.

In accordance with another aspect of this invention, an anti-skid control apparatus for a vehicle braking system includes a pair of front wheels and a pair of rear wheels in which wheel cylinders are diagonally connected in conduits. A first fluid pressure control valve device for controlling the brake fluid pressure of the wheel cylinder of one of said front wheels arranged between a first fluid pressure generating chamber of a tandem master cylinder and the wheel cylinder of the one front wheel. A second fluid pressure control valve device for controlling the brake fluid pressure of the wheel cylinder of another of the front wheels is arranged between a second fluid pressure generating chamber of the tandem master cylinder and the wheel cylinder of the other front wheel. A control unit measures the skid conditions of the front and rear wheels and generates instructions for controlling the first and second fluid pressure control valve devices and a valve apparatus for generating a fluid pressure in accordance with the lower one of the brake fluid pressure of the front wheels controlled with first and second fluid pressure control valve devices is arranged between the wheel cylinders of the front wheels and those of the rear wheels. When a brake-relieving output signal for decreasing the brake fluid pressure is obtained from only one of the rear wheels, it is ignored, and when brake-relieving output signals are obtained from both of the rear wheels, the brake-relieving output signal of one of the rear wheels that is obtained later than that of the other is combined logically with the brake-relieving output signal of the one of the front wheels running on the same side as the one of the rear wheels to form a brake-relieving control signal for controlling the first or second fluid pressure control valve device connected to the wheel cylinder of the one front wheel. A brake-increasing control signal for increasing the brake fluid pressure by the first or second fluid pressure control valve device after the brake-relieving control signal disappears is formed on the basis of the brake-increasing output signal of the one of the one front and rear wheels on the same side, where the acceleration is smaller.

In accordance with a further aspect of this invention, an anti-skid control apparatus for a vehicle braking system includes a pair of front wheels and a pair of rear wheels in which wheel cylinders are diagonally connected in conduits. A first fluid pressure control valve device for controlling the brake fluid pressure of the wheel cylinder of one of said front wheels is arranged between a first fluid pressure generating chamber of a tandem master cylinder and the wheel cylinder of the one front wheel and a second fluid pressure control valve device for controlling the brake fluid pressure of the wheel cylinder of another of said front wheels is arranged between a second fluid pressure generating chamber of the tandem master cylinder and the wheel cylinder of the other front wheel. A control unit for determining skid conditions of the front and rear wheels and for generating instructions for controlling the first and second fluid pressure control valve devices and a valve apparatus for generating a fluid pressure in accordance with the lower one of the brake fluid pressure of said front wheels controlled with said first and second fluid pressure control valve devices are arranged between the wheel cylinders of the front wheels and those of the rear wheel. When a brake-relieving output signal for decreasing the brake fluid pressure is obtained from only one of the rear wheels, it is ignored, and when brake-relieving output signals are obtained from both of the rear wheels, the brake-relieving output signal of the one of the rear wheels that is obtained later than that of the other is combined logically with the brake-relieving output signal of the one of the front wheels running on the same side as the one of the rear wheels to form a brake-relieving control signal for controlling the first or second fluid pressure control valve device connected to the wheel cylinder of the one front wheel. A brake-holding control signal for maintaining the brake fluid pressure constant by the first or second fluid pressure control valve device, before the brake-relieving control signal is generated, is formed by obtaining the logical sum (OR) of the brake-holding output signals of the one front and rear wheel on the same side, and a brake-increasing control signal for increasing the brake fluid pressure by the first or second fluid pressure control valve device, after the brake-relieving control signal disappears, is formed on the basis of the brake-increasing output signal of the one of the front and rear wheels on the same side that has first generated a brake-holding output.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 2:
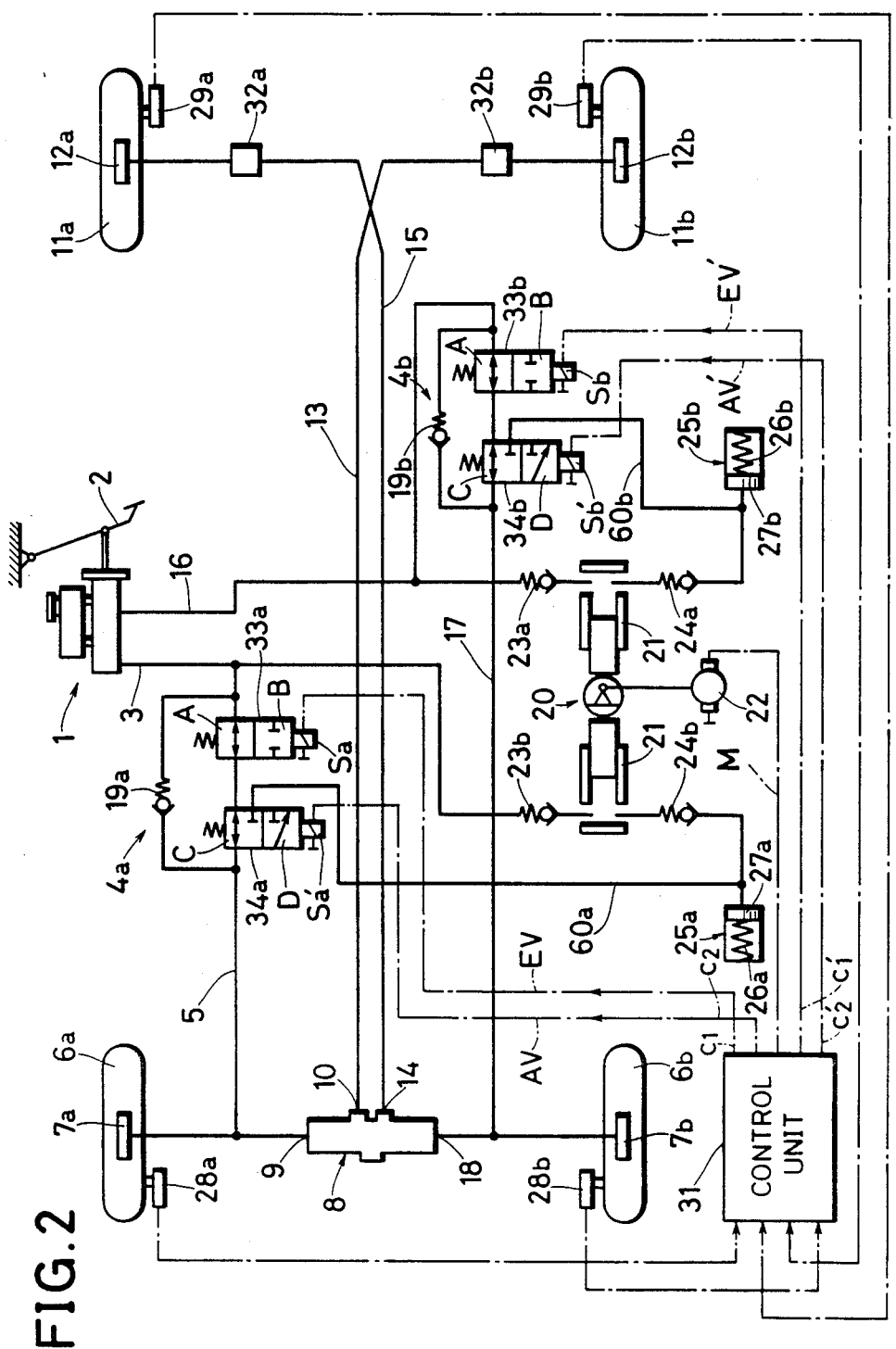
FIG. 2 is an schematic view of a anti-skid control apparatus according to an embodiment of this invention.

In FIG. 2, a brake pedal 2 is connected to a tandem master cylinder 1. One fluid pressure chamber of the tandem master cylinder 1 is connected to a wheel cylinder 7a of a right front wheel 6a through a conduit 3, an electromagnetic two-position valve device 4a and a conduit 5. The conduit 5 is further connected to a first input port 9 of a valve apparatus 8 to be described later. The first input port 9 normally communicates with a first output port 10 in the valve apparatus 8. The first output port 10 is connected to a wheel cylinder 12b of a left rear wheel 11b through a conduit 13 and a proportioning valve 32b.

Another fluid pressure chamber of the tandem master cylinder 1 is connected to a wheel cylinder 7b of a left front wheel 6b through a conduit 16, an electromagnetic two-position valve device 4b and a conduit 17. The conduit 17 is further connected to a second input port 18 of the valve apparatus 8. The second input port 18 normally communicates with a second output port 14 in the valve apparatus 8. The second output port 14 is connected to a wheel cylinder 12a of a right rear wheel 11a through a conduit 15 and a proportional valve 32a.

The two-position valve devices 4a and 4b consist of inlet and outlet valves 33a, and 34a and 33b, and 34b, respectively. Discharge openings of the outlet valves 34a and 34b are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserving chambers of the reservoirs 25a and 25b are connected to suction openings of a fluid pressure pump 20.

Although the fluid pressure pump 20 is schematically shown, it consists of a pair of casings 21, pistons slidably fitted to the casings 21, an electric motor 22 reciprocating the pistons, and check valves 23a, 23b, 24a and 24b. Supply openings of the fluid pressure pump 20 or the sides of the check valves 23a and 23b are connected to the conduits 3 and 16.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31.

Figure 3:
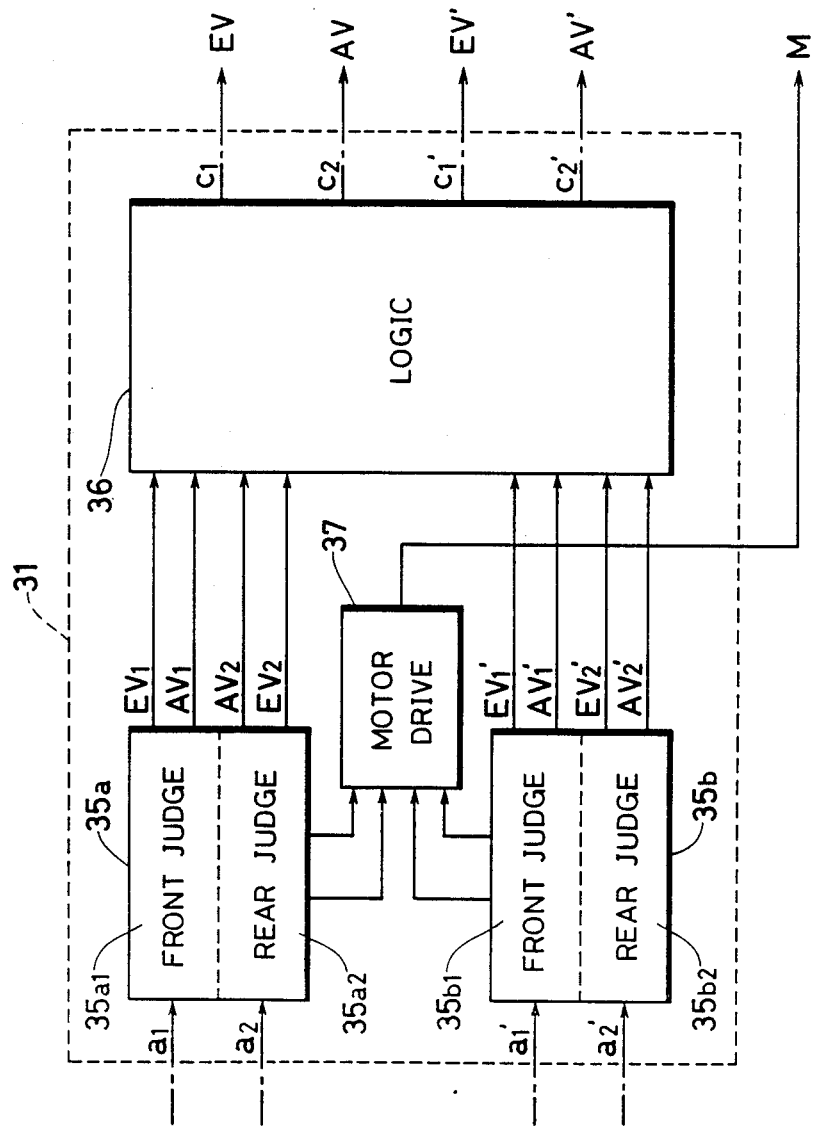
FIG. 3 is a block diagram of a control unit in FIG. 2.

As shown in FIG. 3 the control unit 31 consists of judge circuits 35a, 35b, a logic circuit 36 and a motor drive circuit 37. The judge circuits 35a and 35b are equal to each other in circuits construction. The circuit 35a, 35b, 36 and 37 will be hereinafter described in detail. Output terminals of the wheel speed sensors 28a and 29b are connected to input terminals of the one judge circuit 35a while output terminals of the wheel speed sensors 28b and 29a are connected to input terminals of the other judge circuit 35b. In other words, the one judge circuit 35a receives the wheel speed signals of the right front wheel 11a and left front wheel 6b, judges them and supplies the judge results to the logic circuit 36. The other judge circuit 35b receives the wheel speed signals of the right rear and left front wheels 11a and 6b and judges them. As will be hereinafter described, the judge results are logically combined with each other in the logic circuits 36. Control signals EV and AV, and EV' and Av' are generated at output terminal C1 and C2 and C1' and C2' of the control unit 31. They are supplied to solenoid portions Sa, Sa', Sb and Sb' of the valves 33a, 34a, 33b and 34b, respectively. Dashed lines represent electric lead wires.

Although schematically shown, the electromagnetic valves 33a, 33b, 34a and 34b are if well-known construction. When the control signals AV, EV, AV' and EV' are "0", the valves take first positions A and C so as to increase the brake pressure to the brake at each wheel. In the first positions A and C, the master cylinder side and the wheel cylinder side are connected. When the control signals AV, EV, and AV' and EV' are "1", the valves take second positions B and D that decrease the brake pressure to each brake. In the second positions, B and D, the connection between the master cylinder side and the wheel cylinder side is interrupted, while the connection is maintained between the wheel cylinder side and the reservoir side. The brake fluid is discharged through the conduits 60a and 60b into the reservoirs 25a and 25b from the wheel cylinders 7a, 7b and 12a and 12b. When the control signals AV and AV' are "0" and EV and EV' are "1", the valves 33a and 33b take the second positions B, and the valves 34a and 34b take the first positions C. Thus, brakes pressure to the brake are held constant.

The control unit 31 further generates a drive signal M for a motor 22 that continues during the skid control operation.

Figure 4:
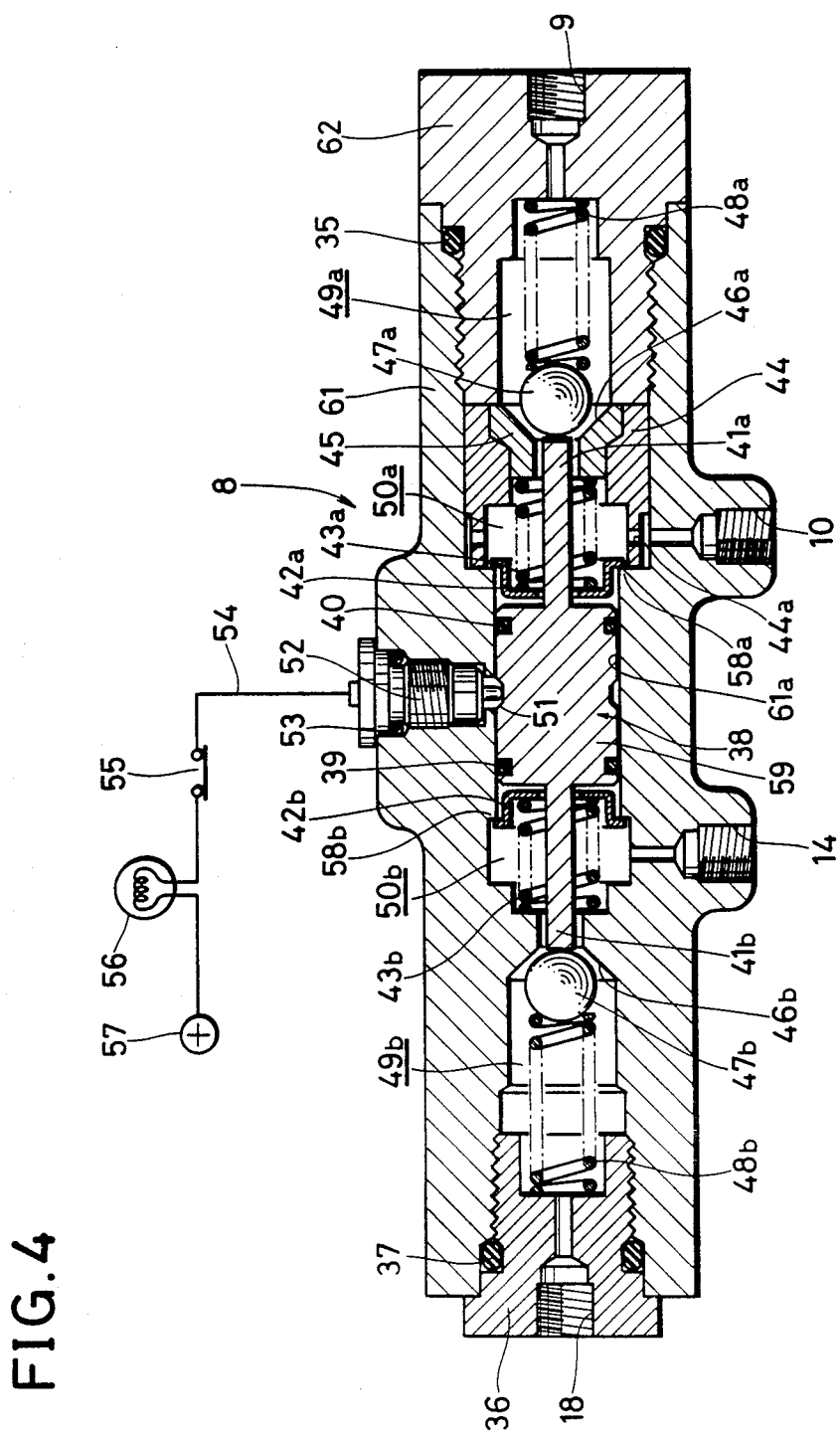
FIG. 4 is an enlarged cross-sectional view of a valve apparatus in FIG. 2.

FIG. 4 shows details of the valve apparatus 8, to which the brake fluid pressures are applied from the wheel cylinders 7a and 7b of the front wheels 6a and 6b.

A stepped through-hole 61a is axially formed in a casing 61 of the valve apparatus 8. A cover member 62 provided with a seal ring 35 is screwed to a right opening portion of the casing 61. Another cover member 36 provided with a seal ring 37 is screwed to a left opening portion of the casing 61. The first and second input ports 9 and 18 are formed in the cover members 62 and 36 respectively.

A piston 38 provided with seal rings 39 and 40 is slidably fitted to a central portion of the stepped hole 61a. Rod portion 41a and 41b of the piston 38 normally is in contact with valve balls 47a and 47b across output chambers 50a and 50b respectively. The valve balls 47a and 47b are positioned in input chambers 49a and 49b, and are urged toward valve seats 46a and 46b by springs 48a and 48b. The one valve seat 46b is formed in the inner wall of the casing 61 and the other valve seat 46a is formed in a valve forming member 45 which is press fitted to a cylindrical member 44. The above output chamber 50a is inside the is connected through hole 44a in the circumferential wall portion to the first output port 10. The other output chamber 50b connectes directly to the second output port 14.

Spring receiving rings 42a and 42b are slidably fitted to the rod portions 41a and 41b of the piston 38 to receive springs 43a and 43b. They are urged toward the center by the springs 43a and 43b. Normally, flange portions of the spring receiving rings 42a and 42b are in contact with stepped portions 58a and 58b of the casing 61. There are little gaps between the spring receiving rings 42a and 42b and a main portion 59 of the piston 38. Thus, the neutral position of the piston 38 is determined in the stepped hole 61a.

A switch 52 provided with a seal ring 53 is tightly fitted into a hole made in the central wall of the casing 61. An actuator of the switch 52 is engaged by a groove 51 made in the circumference of the piston 38 in the neutral position. An electric wire 54 from the switch 52 is connected through a contact 55 of a normally closed relay and a warning lamp 56 to a positive terminal of a battery 57. The warning lamp 56 is energized when the contact 55 remains closed and the switch 52 is operated. The contact 55 of the normally closed relay is opened when the antiskid apparatus of FIG. 2 operates. For example when the fluid pressure pump 20 operates, the contact 55 is opened.

Figure 1:
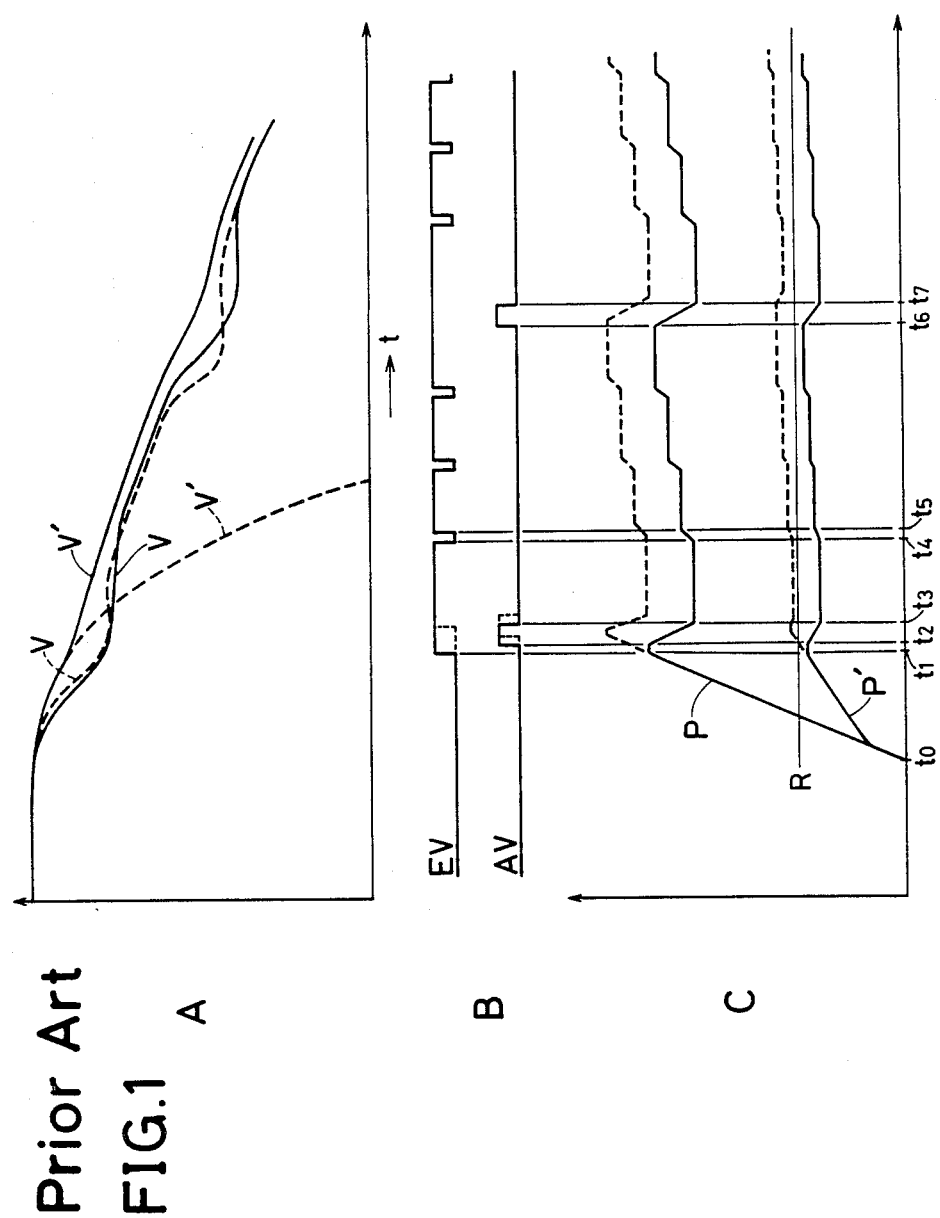
FIG. 1 is a set of graphs for explaining operations of a prior art anti-skid control apparatus.

In the neutral position of the piston 38 that is shown in FIG. 1, the valve balls 47a and 47b are separated from the valve seats 46a and 46b by the rod portions 41a and 41b. The input chambers 49a and 49b are connected to the output chambers 50a and 50b.

In FIG. 2, check valves 19a and 19b are connected in parallel with the elctromagnetic valves 4a and 4b. They permit brake fluid to flow only in the direction from the wheel cylinder side towards the master cylinder side. Both sides of the valves 4a and 4b are connected to each other through throttling holes in the A and C- positions. Accordingly, pressurized fluid is rapidly returned through the check valves 19a and 19b to the master cylinder 1 from the wheel cylinders 7a, 7b, 12a and 12b when the brake is released.

Figure 5:
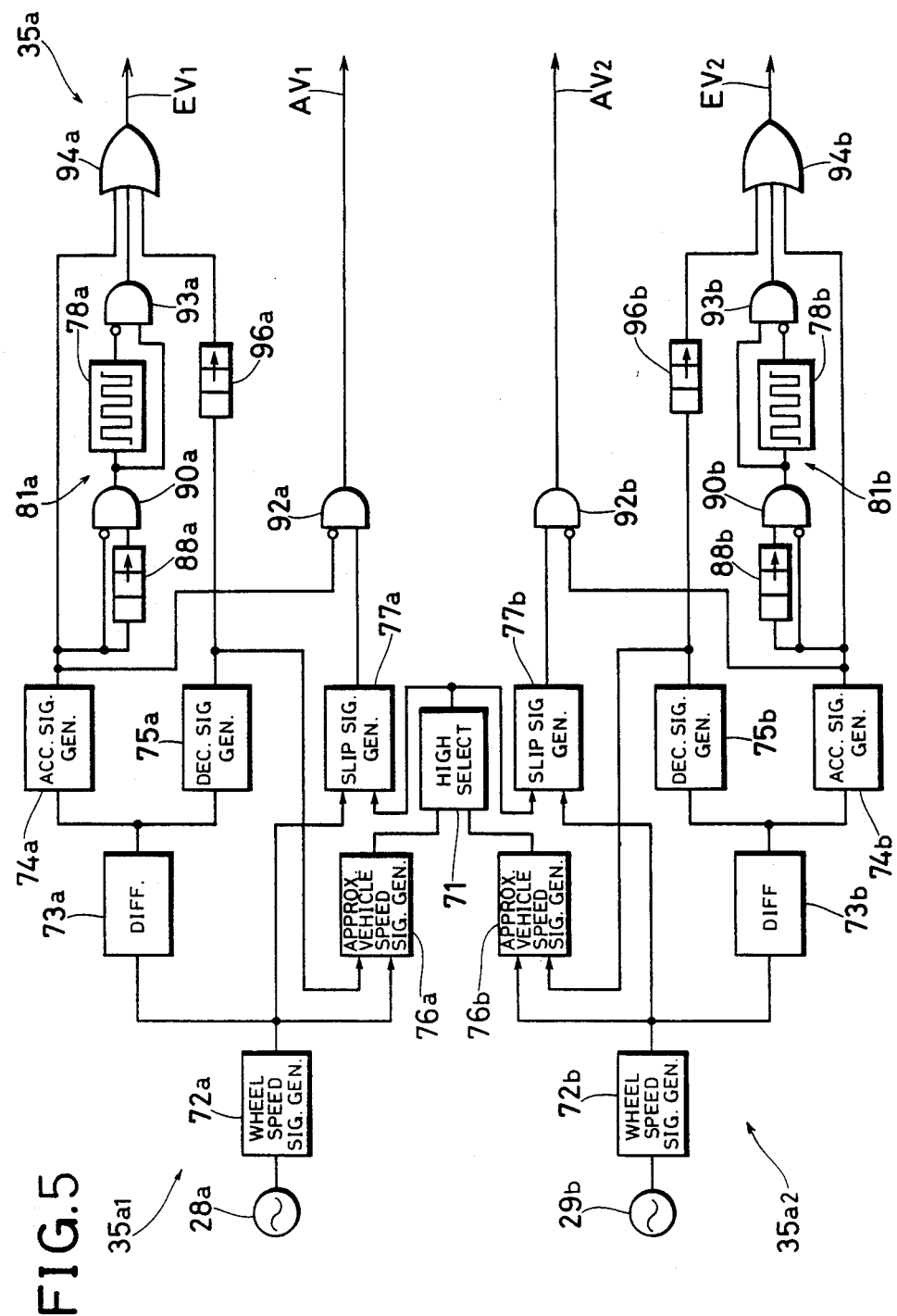
FIG. 5 is a circuit diagram of one judge circuit in FIG. 3.

Referring now to FIG. 5, the first and second judge circuits 35a and 35b consist of front wheel judge parts 35a1 and 35b1 and rear wheel judge parts 35a2 and 25b2, respectively. The signals from the wheel speed sensors 28a and 29a are supplied to wheel speed signal generators 72a and 72b. Digital or analogue outputs proportional to the wheel speeds are obtained from the wheel speed signal generators 72a and 72b and their time derivatives are obtained from differentiators 73a and 73b.

The approximate vehicle speed signal generators 76a and 76b receive the outputs of the speed signal generators 72a and 72b. The outputs of the approximate vehicle speed signal generators 76a and 76b are equal to the outputs of the wheel speed signal generators 72a and 72b, until the deceleration of the wheel reaches a predetermined value. After it becomes higher than the predetermined value, the outputs of the approximate vehicle speed signal generators 76a and 76b decrease at a predetermined rate with time. The initial outputs are equal to the outputs at the time when the deceleration of the wheel has reached the predetermined value. The output of the approximate vehicle speed signal generators 76a and 76b are supplied to a selecting circuit 71. The higher of the outputs of the approximate vehicle speed generators 76a and 76b is selected by the selecting circuit 71, and the selected valve is supplied to the slip signal generators 77a and 77b to be compared with the outputs of the wheel speed signal generators 72a and 76b. A predetermined reference ratio or amount is set in the respective slip signal generator 77a and 77b. The reference ratio or amount is for example, 0.15 (15%).

Generally, a slip ratio S of the wheel is given by the following formula:

$$S = 1 - \frac{\text{wheel speed }(V, V')}{\text{vehicle speed }(E)}$$

When $$\left(1 - \frac{V, V'}{E}\right)$$

is larger than the reference ratio,
a slip signal S is generated for the slip signal generator 77a. Specifically the output of the slip signal generator 77a is switched to a higher level "1".

The differentiators 73a and 73b receive the outputs of the wheel speed signal generators 72a and 72b and differentiate them with respect to time. The outputs of the differentiators 73a and 73b are supplied to deceleration signal generators 75a and 75b and to acceleration signal generators 74a and 74b. A predetermined threshold deceleration (for example, −1.5g) is set in the deceleration signal generators 75a and 75b, and this threshold decelerator is compared to the outputs of the differentiators 73a and 73b. A predetermined threshold acceleration (for example, 0.5g) is set in the acceleration signal generators 74a and 74b, and it is compared with the outputs of the differentiators 73a and 73b. When the deceleration of the wheel becomes larger than the predetermined threshold deceleration (−1.5g), a deceleration signal b is generated from the deceleration signal generators 75a or 75b. When the acceleration of the wheel becomes larger than the predetermined threshold acceleration (0.5g), an acceleration signal +e,uns/b/ is generated from the acceleration signal generator 74a or 74b.

Output terminals of the acceleration signal generators 74a and 74b are connected to negation input terminals (indicated by circles) of AND gates 92a, 92b, 90a and 90b and to OFF delay timers 88a 88b and first input terminals of OR gates 94a and 94b. Output terminals of the OFF delay timers 88a and 88b are connected to input terminals of the AND gates 90a and 90b. Output terminals of the AND gates 90a and 90b are connected to input terminals of pulse generators 78a and 78b and input terminals of AND gates 93a and 93b. Output terminals of the pulse generators 78a and 78b are connected to negation input terminals of the AND gates 93a and 93b. Signal generators 81a and 81b that increase the braking in steps comprise the acceleration signal generators 74a and 74b, the OFF-delay timers 88a and 88b, the pulse generators 78a and 78b, the OR gates 94a 94b, and the AND gates 93a and 93b. The signal generators 81a and 81b generate pulse signals to increase the brake pressure slowly during the delay time of the OFF delay timers 88a and 88b. Output terminals of the AND gates 93a and 93b are connected to second input terminals of the OR gates 94a and 94b.

Output terminals of the deceleration signal generators 75a and 75b are connected to third input terminals of the OR gates 94a and 94b through OFF-delay timers 96a and 96b and to input terminals of the approximate vehicle speed signal generators 76a and 76b. Output terminals of the slip signal generators 77a and 77b are connected to other input terminals of the AND gates 92a and 92b.

Signals EV1, EV2, AV1 and AV2 at output terminals of the OR gates 94a and 94b and AND gates 92a and 92b are judge results that are supplied to the following stage, the logic circuit.

Signals EV1′, EV2′, AV1′ and AV2′ corresponding to the above signals EV1, EV2, AV1 and AV2 respectively, are similarly formed in the second judge circuit 35b.

The signals EV′ and AV′ represent the judging results of the skid condition of the left front wheel 6b, and the signals EV2′ and AV2′ represent those of the right rear wheel 11a.

Next, the details of the logic circuit 36 will be described with reference to FIG. 6.

The logic circuit 36 is constructed symmetrically with respect to the judge circuits 35a and 35b. Output terminals of a right-side skid signal selecting circuit 200a and a left-side skid signal selecting circuit 200b to be described hereinafter in detail are connected to one input terminal of first OR gates 100a and 100b respectively. Output terminals of second OR gates 103a and 103b are connected to other input terminals of the first OR gates 100a and 100b. The output signals AV1 and AV1′, are each supplied to one input terminal of the second OR gates 103a and 103b. Output terminals of AND gates 104a and 104b are connected to other input terminals of the second OR gates 103a and 103b.

Output terminals of AND gates 101a and 101b are each connected to one input terminal of other AND gates 104a and 104b, and to another input terminal thereof through ON delay timers 105a and 105b and inverters 106a and 106b. The signals AV2′ and AV2 are each supplied to one input terminal of the AND gates 101a and 101b. Q output terminals of D (Delay) flip-flops 120a and 120b are connected to other input terminals of the AND gates 101a and 101b. The signals AV2′ and AV2 are further supplied to C input terminals of the flip-flops 120a and 120b and to D input terminals of the flip-flops 120a and 120b, respectively. The signal AV2 or AV2′ supplied to the D input terminal is read out with the other signal AV2′ or AV2 supplied to the C input terminal. An output terminal of a NOR gate 121 is connected to reset terminals R of the flip-flops 120a and 120b.

The signals AV2 and AV2′ are supplied to input terminals of the NOR gate 121. Output terminals of the OR gates 100a, 100b, 103a and 103b are connected to the solenoid portions Sa and Sb of the inlet valves 33a and 33b as shown in FIG. 2 and to the solenoid portions Sa′ and Sb′ of the outlet valves 34a and 34b through amplifiers 107a, 107b, 108a and 108b, respectively.

The control signals EV, AV, EV′ and AV′ as amplified by the amplifiers 107a, 107b, 108a and 108b are supplied to the solenoid portions Sa, Sa′, Sb and Sb′ of the chargeover valves 4a and 4b shown in FIG. 2. The signals AV2 and AV2′ indicate that the slips of the rear wheels 11a and 11b have become higher than the predetermined slip ratio. The brake fluid pressures of the front wheels 6a and 6b are reduced in response to the output signals AV2 and AV2′. When the output signals AV2 and AV2′ continue for longer than a predetermined time, the output signals AV2 and AV2′ are terminated to prevent the brake from being relieved too much. The predetermined time is set as a delay time in the ON delay timers 105a and 105b.

Figure 7:
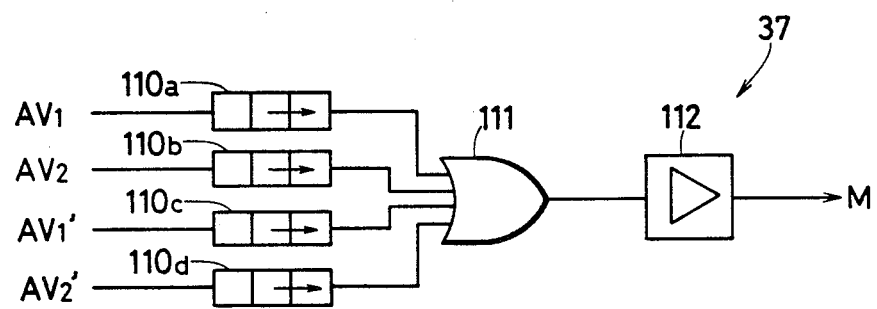
FIG. 7 is a circuit diagram of a motor drive circuit in FIG. 3.

FIG. 7 shows the motor drive circuit 37. In FIG. 7, OFF delay timers 110a, 110b, 110c and 110d are connected to an OR gate 111 the output of which is connected to an amplifier 112. The output signals AV1, AV2, AV1′, AV2′ are supplied to the OFF delay timers 110a, 110b, 110c and 110d respectively. The output M of the motor drive circuit 37 is supplied to the motor 22 of FIG. 2.

Figure 6:
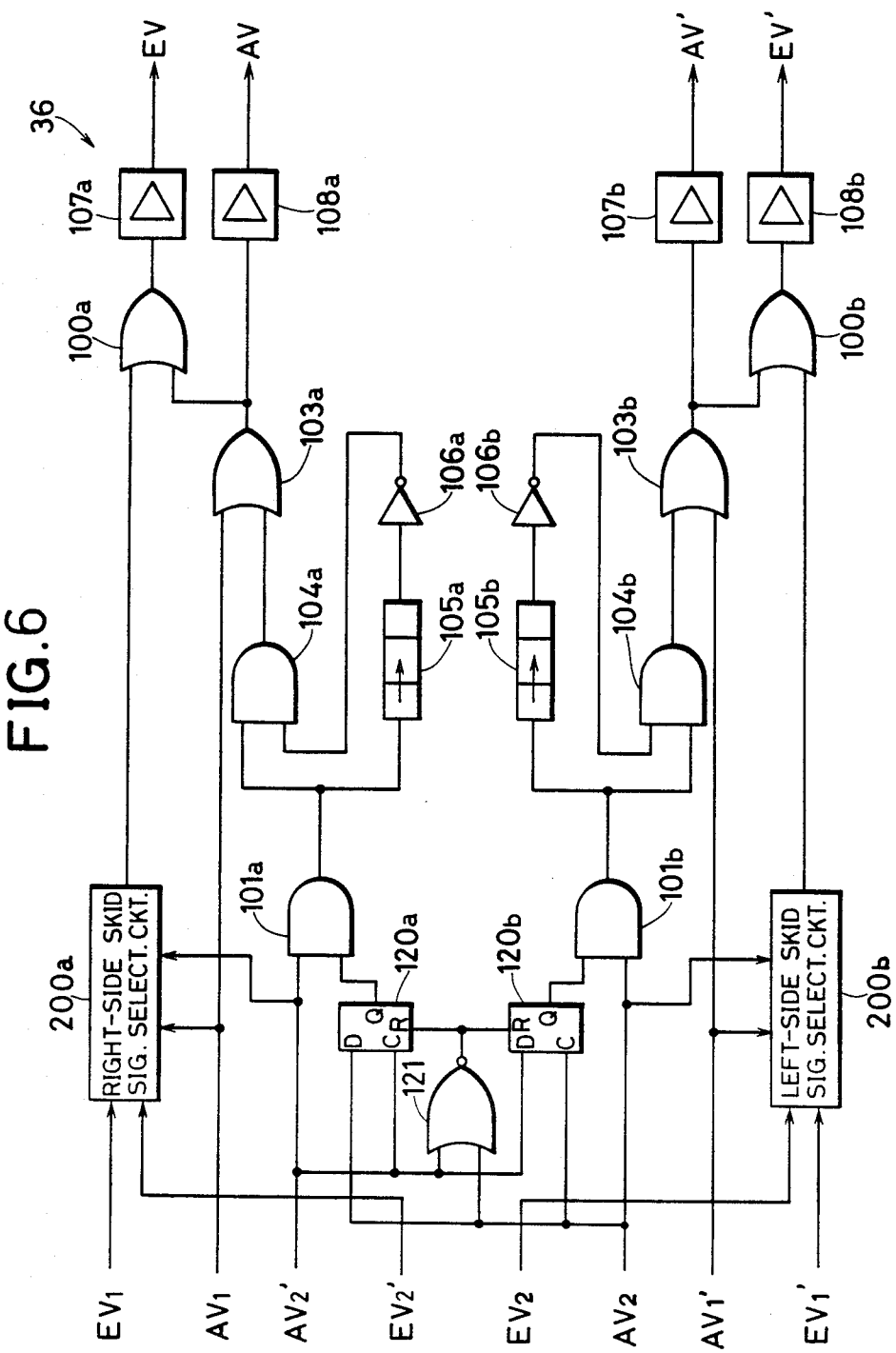
FIG. 6 is a circuit diagram of a logic circuit in FIG. 3.

The right-side and left-side skid signal selecting circuits 200a and 200b of FIG. 6 include flip-flops, AND gates, OR gates etc., respectively and receive the output signals EV1, EV2', AV1 and AV2', and EV1', EV2, AV1' and AV2 of the judge circuits 35a and 35b, respectively. The circuits 200a and 200b detect which of the signals AV1 and AV2' and AV1' and AV2 disappears later, respectively, and select either the signal EV1 or the signal EV2', and the signal EV1' or the signal EV2 on the basis of the above detection. They generate the logical sums of the signals EV1 and EV2', and the signals EV' and EV2 before the signals AV1 or AV2' and AV1' or AV2 which shall disappear later, are generated, or while the same signals AV1 or AV2' and AV1' or AV2 are appearing, respectively.

Now, suppose that the wheels 6a, 6b, 11a and 11b are provided with tires of the same kind and run on a road which is uniform in frictional coefficient. Suppose further that vehicle driver operate the brake pedal 2. At the beginning of the braking, the control signals EV, AV, EV', AV' from the control unit 31 are "0". Accordingly, the valves 33a and 33b and 34a and 34b are in the A-position and the C-position. Pressurized fluid is supplied from the master cylinder 1 to the wheel cylinders 7a and 7b of the front wheels 6a and 6b through the conduits 3 and 16, the valves 33a, 33b, 34a and 34b and the conduits 5 and 17. Pressurized fluid is also supplied to the wheel cylinders 12a and 12b of the rear wheels 11a and 11b through the first and second input ports 9 and 18, the input chambers 49a and 49b, the output chambers 50a and 50b the first and second output ports 10 and 14 in the valve apparatus 8, and the conduits 13 and 15. Thus, the wheels 6a, 6b, 11a and 11b are braked. The proportioning valves 32a and 32b operate in a well-know way, as follows. When the input pressure is lower than a predetermined value, it is, transmitted to the output side without reduction. When the input pressure is higher than the predetermined value, it is reduced by a substantially constant factor and transmitted to the output side.

When the deceleration of the wheels 6a, 6b, 11a and 11b becomes higher than the predetermined deceleration with the increase of the brake fluid pressure, the deceleration signal e,uns/b/ is generated from the deceleration signal generators 75a and 75b in the judge circuits 35a and 35b of FIG. 5. Suppose first that the decelerations or slips of the wheels 6a, 6b, 11a and 11b change equally and reach the predetermined deceleration or slip at the same time.

The signals EV1, EV2, EV1', EV2' become "1" with the deceleration signal −b. The output signals EV, EV' of the logic circuit 36 of FIGS. 3 and 6 become "1" with the signals EV1, EV2, EV1', EV2'. The solenoid portions Sa and Sb of FIG. 2 are energized. The valves 33a and 33b take the second position B. The conduits 3 and 16 are disconnected from the conduits 5 and 17. Further, the conduits 5 and 17 are disconnected from the conduits 60a and 60b. Thus the brake fluid pressures of the wheel cylinders 7a, 7b, 12a, and 12b are hold constant.

When the deceleration of the wheel becomes lower than the predetermined deceleration, the deceleration signal e,uns/b/ disappears for the deceleration signal generators 75a and the valves 33a and 33b are again changed into the position A after the delay time of the OFF delay timer 96a times out. Thus, the brake fluid pressure again increases. When the slip of the wheels reaches the predetermined slip, the slip signal S is generated from the slip signal generator 77a, but the acceleration signal generator 74a does not yet generate the acceleration signal +b. Accordingly, the outputs AV1, AV2, AV1' and AV2' of the AND gates 92a become "1". The outputs AV, AV', EV and EV' of the logic circuit 36 become "1". The valves 33a, 33b, 34a and 34b are switched to the positions B and D and conduits 3 and 16 are disconnected from the conduits 5 and 17, respectively. However, the conduits 5 and 17 are connected to the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15 and 13, the output ports 14 and 10, the output chambers 50a and 50b, the input chambers 49a and 49b, the input ports 18 and 9 in the valve apparatus 8, and the conduits 17, 5, 60a and 60b thence, into the hydraulic reservoirs 25a and 25b. Thus the brakes of the wheels 6a, 6b, 11a and 11b are relieved.

The fluid pressure pump 20 starts to drive with the signals AV1, AV2, or AV1' and AV2'. The brake fluid is drown from the reservoirs 25a and 25b and supplied toward the conduits 3 and 16 at nearly the same rate by the fluid pressure pump 20. Accordingly, the fluid pressures at both sides of the piston 38 are decreased at about the same rate. The piston 38 remains in the neutral position, and the valve balls 47a and 47b remain separated from the valve seats 46a and 46b.

When the wheel speeds become higher and the accelerations of the wheels reach the predetermined acceleration, the acceleration signal +b is generated from the acceleration signal generators 74a. Thus, the outputs EV1, EV2, EV1' and EV2' of the judge circuits 35a and 35b become "1" and the outputs EV and EV' of the logic circuit 36 become "1". Accordingly, the brake fluid pressure of the wheels is kept constant.

The pulse generators 78a and 78b start starts to drive with disappearance of the acceleration signal +b. The outputs EV1, EV2, EV1' and EV2' cycle between "0" and "1" "0", "1", . . . for the delay time of the OFF-delay timers 88a. Accordingly, the outputs EV and EV' of the logic circuit 36 change similarly. The brake pressures of the wheels increase in steps. These operations continue.

When the speed of the vehicle reaches the desired valve or when the vehicle stops, the brake pedal 2 is released. The brake fluid is returned from the wheel cylinders 7a, 7b, 12a and 12b to the master cylinder 1 through the conduits, the valve apparatus 8, the valves 4a and 4b and the check valves 19a and 19b.

It was supposed above that the control signals EV1, EV2, EV1' and EV2' or AV1, AV2, AV1' and AV2' become "0" or "1" at the same time. However, when the frictional coefficients of the road differ considerably different from right to left, the control signals do not become "0" or "1" at the same time. For example, when the frictional coefficient mu of the right side of the road is relatively small, the control signal EV1, EV2 or AV1, AV2 first becomes "1". We now consider this case.

To simplify the description, assume that the deceleration signals −e,uns/b/ or slip signals S of the right wheels 6a and 11a are generated at the same time. In other words suppose the outputs EV1 and EV2' or AV1 and AV2' of the first and second judge circuits 35a and 35b become "0" or "1" at the same time. The output EV or AV of the logic circuit 36 then becomes "0" or "1" in synchronization with the output EV1 or AV1. The brake fluid pressure of the right front wheel 6a is held constant or decreased by operation of the valves 33a and 34a. The left wheels 6b and 11b on the higher frictional road side (high mu side) do not yet tend to lock. Accordingly, the outputs EV', AV' of the logic circuit 36 are "0" and the valves 33b, 34b are not operated. The brake fluid pressure of the front wheel 6b continues to rise.

In the valve apparatus 8 shown in FIG. 4, the fluid pressure is decreased in the input and output chambers 49a and 50a at the right side of the piston 38. On the other hand, the brake fluid continues to be supplied to the wheel cylinders 7b and 12a from the master cylinder 1. Accordingly, the force pushing the piston 38 to the right in FIG. 4 become larger and piston 38 is moved to the right. Thus, the left valve ball 47b is moved to the valve seat 46b by action of the spring 48b. On the other hand, the right valve ball 47a is further separated from the valve seat 46a by the rod portion 41a. The right input chamber 49a continues to be connected to the right output chamber 50a, while the left input chamber 49b is disconnected from the left output chamber 50b. Thus, the fluid supply to the wheel cylinder 12a of the one rear wheel 11a is interrupted from the master cylinder 1.

When the piston 38 is moved further to the right with the decrease of the fluid pressure of the right input and output chambers 49a and 50a, the volume of the left output chamber 50b that is disconnected from the left input chamber 49b is increased. In other words, the fluid pressure of the wheel cylinder 12a of the rear wheel 11a is lowered since the wheel cylinder 12a is connected to the left output chamber 50b through the output port 14 and the conduit 15.

When the control signals EV and AV become again "0" to increase the fluid pressure of the input and output chambers 49a and 50a, the piston 38 is moved to the left to decrease the volume of the left output chamber 50b, while the left valve ball 47b seats on the valve seat 46b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 7a is controlled in accordance with the brake fluid pressure of the wheel cylinders 7a of the front wheel 6a. Thus, the rear wheel 11a that runs on the side of the road with the lower frictional coefficient is prevented from locking, as is the front wheel 6a on the same side. If the brake fluid pressure of the wheel cylinder 12a of the rear wheel 11a is controlled in common with the brake fluid pressure of the wheel cylinder 7b of the front wheel 6b running on the side having the higher frictional coefficient, the rear wheel 11a would be locked. Since the brake fluid pressure of the front wheel 6b on the high $\mu$ side is independently controlled, the brake distance is not increased.

The case described above supposed that all of the wheels are provided with tires of the same kind. Next, suppose that only the front wheels 6a and 6b are provided with spiked tires or chains on a vehicle that runs on a split road, the friction coefficients of which are considerably different at the right and left sides. In particular, suppose the right front and rear wheels 6a and 11a run on the low-$\mu$ side and the left front and rear wheels 6b and 11b run on the high-$\mu$ side.

Figure 8:
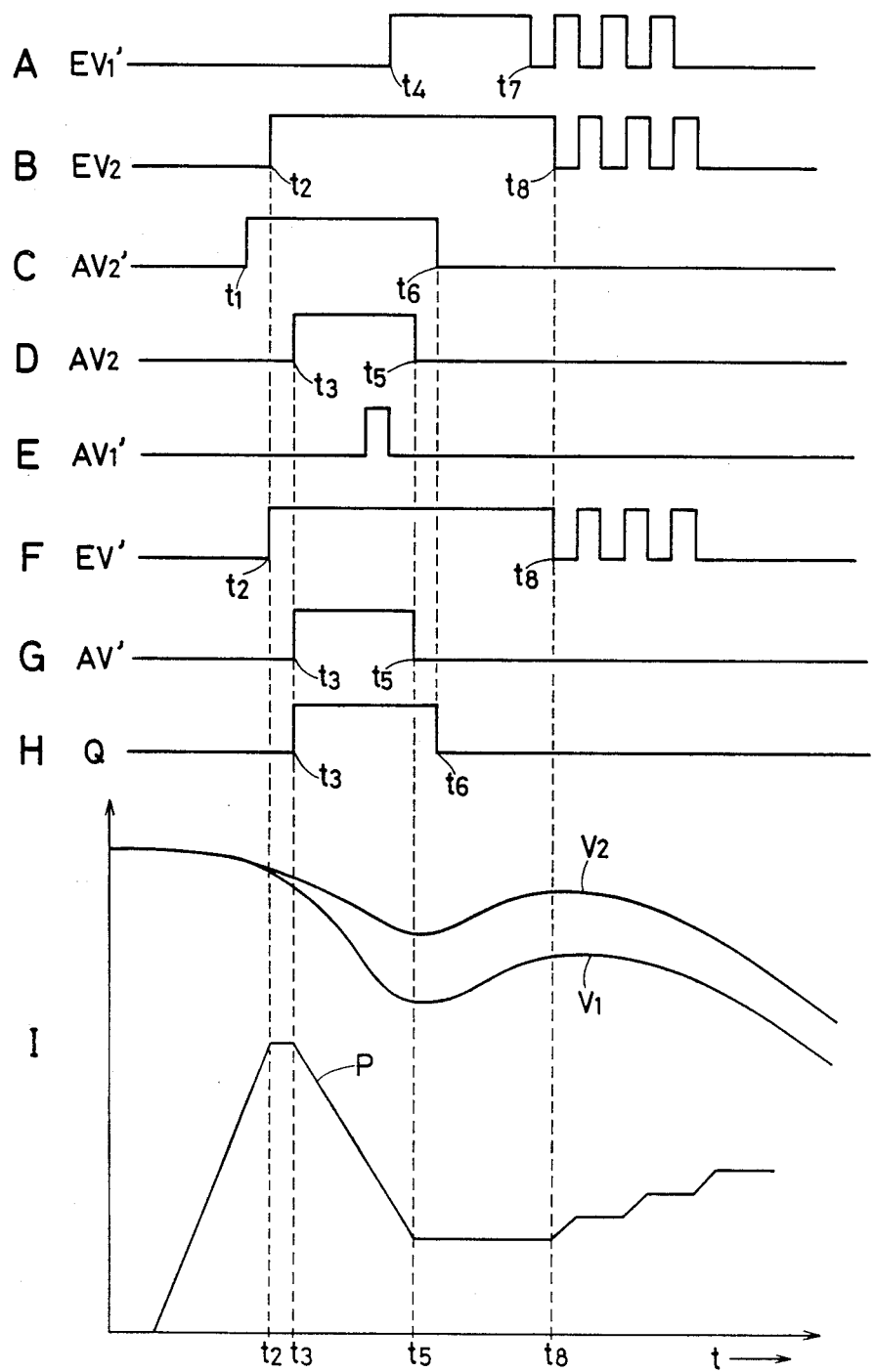
FIG. 8 is a set of graphs for explaining operations of the embodiment of this invention

To facilitate understanding, only the output signals AV1', AV2, AV2', EV1' and EV2 which effect the output signals AV' and EV' that drives the one fluid pressure control valve device 4b are shown in FIG. 8. The brake fluid pressure P of the front wheel 6b increases with the braking operation, as shown in FIG. 8I. The fluid pressure of the other front wheel 6a increases similarly. At time t1, the rear wheel 11a on the low-$\mu$ side begins to lock and the output signal AV2' becomes "1" as shown in FIG. 8C. In FIG. 6, the input to the C terminal of the flip-flop 120a is "1", but, the input to the $\overline{D}$ terminal is still "0", so the Q output of the flip-flop 120a is "0" and the output of the AND gate 101a is "0". The input to the D terminal of the other flip-flop 120b is "1" and input to the C terminal of the flip-flop 120b is still "0", so its Q output is "0" and the output of the AND gate 101b is "0". Therefore, the output signals EV, AV, EV' and AV' of the logic circuit 36 are still "0" and the brake fluid pressure P continues to rise.

At time t2, the output EV2 becomes "1", as shown in FIG. 8B. Accordingly, the output of the left-side skid signal selecting circuit 200b and therefore the output EV' of the logic circuit 36 becomes "1" and, the brake fluid pressure P is held constant.

At time t3, the slip of the rear wheel 11b on the high-mu side becomes higher than the predetermined slip ratio. The output AV2 becomes "1" as shown in FIG. 8D. The Q output of the flip-flop 120b becomes "1" as shown in FIG. 8H and so the outputs AV' and EV' of the logic circuit 36 become "1". The brake fluid pressure P is reduced.

At time t4, the output EV1, becomes "1". However, the output of the logic circuit 36 is not effected.

At time t5, the output AV2 goes to "0", and thus the output AV' of the logic circuit 36 becomes "0". Since the output EV1 is still "1", the output EV1 continues to be "1" and the brake fluid pressure P is held constant.

At time t6, the output AV2' becomes "0" and so the output of the NOR gate 121 becomes "1". The flip-flop 120b is reset and its Q output becomes "0". However, the outputs AV' and EV' of the logic circuit 36 are not changed. The brake fluid pressure P is still held constant.

At time t7, the output EV1 becomes "0". After that, it cycles between "0" and "1" as shown, "1", "0"... However, the signal EV2 is selected by the left-side skid signal selecting circuit 200b. Accordingly, the output EV' of the logic circuit 36 is not influenced. However, the output EV2 is still "1", and, the output EV' is held at "1". As shown in FIG. 8E, the output AV1' of the left front wheel 6b rises and drops during the generation of the output AV2.

At time t8, the output EV2 begins to cycle as shown, since the acceleration signal of the rear wheel 11b has gone to "0". The output EV' of the logic circuit 36 changes cycles between "0" and "1"... in synchronization with the cycling signal EV2. The brake fluid pressure P rises in steps as shown in FIG. 8I. In other words, the brake fluid pressure is slowly increased by the output signal EV2 of the rear wheel 11b which is reaccelerates more slowly, than the front wheel 6b. The rear wheel 11b is also likely to accelerate than the front wheel 6b.

During the time t3–t5, the brake fluid pressure P of the front wheel 6b is reduced and the rear wheel 11a of the same conduit system is reduced, too. The brake fluid pressure of the other rear wheel 11b is reduced by operation of the valve apparatus 8. Although the rear wheel 11a tends to lock during the time t1-t2 and during the time t5-t6, its braking force is not reduced. However, since the other rear wheel 11b does not tend to lock during that time, the stability of the steering is not lost. Of course, both of the front wheels 6a and 6b are not in the locked condition and therefor there is no problem of steering the vehicle. The braking distance can also be shortened. The wheel speeds V1 and V2 of the rear wheels 11a and 11b change with time as shown in FIG. 8I. Anti-skid control can be stably effected. In this embodiment, the brake relieving time is limited by the delay time of the ON delay timers 105a and 105b in FIG. 6 and so the braking distance is shortened as much as possible.

Operation is similar when the front wheels 6a and 6b are provided with spiked tires or chains or are subject to thermal fading, and when the vehicle runs on a road which is uniform in frictional coefficient.

Next, suppose one of the two conduit systems fails. For example, when brake fluid leaks from the one conduit system including the conduit 3, the fluid pressures of the wheel cylinders 7a and 12b do not increase when the brake pedal is operated. On the other hand, the fluid pressures of the other conduit systems including the conduit 16 increase when the brake pedal 2 is operated. Accordingly, the piston 38 is moved to the right in the valve aapparatus 8. Since the anti-skid control is not effected, the contact 55 remains closed. The switch 52 is actuated with the movement of the piston 38. Electric current flows through the warning lamp 56 from the battery 57, and warning lamp 56 lights. Thus, the vehicle driver knows that the anti-skid apparatus has failed. When the anti-skid apparatus is operating, the contact 55 is opened at the beginning of the anti-skid control operation (for example, the beginning of the drive of the fluid pressure pump 20). Accordingly, the warning lamp 57 does not light with the movement of the piston 38.

While the preferred embodiment has been described, variations thereto will occur to those skilled in the art within the scope of the present inventive concepts which are delineated by the following claims.

For example, the judge circuit is not limited to that of FIG. 5, but a well-known judge circuit may be applied to this invention.

Further, in the above embodiment, the fluid pressure control valves 4a and 4b consist of inlet and outlet valves 33a and 34a, and 33b and 34b, respectively. However, they may consist of a single three-position valve, respectively.

Further, in the above embodiment, the durations of the outputs of the AND gates 104a and 104b for brake-relieving are limited by the ON-delay timers 105a and 105b. However, these timers may be omitted. In that case, the output terminals of the AND gates 101a and 101b are directly connected to the OR gates 103a and 103b.

In the above embodiment, the larger of the outputs of the approximate vehicle speed generators 76a, 76b is selected for forming slip signals. However, the approximate vehicle signal may be formed on the basis of the higher wheel speed signals for forming slip signals.

In the above embodiment, the approximate vehicle speed is formed on the basis of the wheel speeds of the front and rear wheels on the same conduit system. However, it may be formed on the basis of the wheel speeds of all of the wheels.

In the above embodiment, the proportioning valves 32a and 32b are arranged between the valve apparatus 8 and the wheel cylinders 12a and 12b. However, they may be omitted.

In the above embodiment, the brake fluid pressure is increased in steps directly after the acceleration signal $=\underline{b}$ or signal EV1, EV1', EV2 or EV2' disappears. However, the start of the stepwise increase may be retarded. Thus, the brake fluid pressure P may be rapidly increased for a predetermined time directly after the acceleration signal $+\underline{b}$ or signal EV1, EV1', EV2 or EV2' disappears, and then it may be increased in steps In the above embodiment, the right-side and left-side skid signal selecting circuits 200a and 200b detect which of the outputs AV1 and AV2', and AV1' and AV2, disappear later, and the circuits 200a and 200b may select the output EV1 or EV2' and EV1' or EV2 of the corresponding wheels on the basis of the detected results. However, they may detect which of the outputs AV1 and AV2', and AV1', and AV2 appear earlier, and they may select the output EV1 or EV2' and EV1' or EV2 of the corresponding wheels on this basis. In that case, the same effect as the above embodiment can be obtained.

The ones of the outputs EV1 and EV2, and EV1' and EV2 which are generated earlier may also be selected by the right-side and left-side skid signal selecting circuits. The brake fluid pressure may be again increased in accordance with the skid condition of the one of the rear and front wheels, both the brake holding signals (EV1 or EV2 and EV1' or EV2') and the brake relieving signals (AV1 or AV2' and AV1', or AV2) of which are generated earlier. In any case, the brake fluid pressure is again increased in accordance with the skid condition of the one of the front and rear wheels on the same side which is more likely to lock than the other.

What is claimed is:

1. In an anti-skid control apparatus for a vehicle braking system including:
   (A) a pair of front wheels, and a pair of rear wheels in which wheel cylinders are diagonally connected in conduits;
   (B) a first fluid pressure control valve device for controlling the brake fluid pressure of the wheel cylinder of one of said front wheels, arranged between a first fluid pressure generating chamber of a tandem master cylinder and said wheel cylinder of the one front wheel;
   (C) a second fluid pressure control valve device for controlling the brake fluid pressure of the wheel cylinder of another of said front wheels, arranged between a second fluid pressure generating chamber of said tandem master cylinder and said wheel cylinder of the other front wheel;
   (D) a control unit for judging the said conditions of said front and rear wheels and for generating control signals for controling said first and second fluid pressure control valve devices; and
   (E) a valve apparatus for generating a fluid pressure in accordance with the lower of the brake fluid pressures of said front wheels controlled with said first and second fluid pressure control valve devices, being arranged between said wheel cylinders of the front wheels and thoe of the rear wheels; the improvements in which, when a brake-relieving output signal for decreasing the brake fluid pressure is obtained from only one of said rear wheels, it is neglected, and when the brake-relieving output signals are obtained from both of said rear wheels, the brake-relieving output signal of the one of said rear wheels which is obtained later than that of the other is logically combined with the brake-relieving output signal of the one of said front wheels running on the same side as said one of the rear wheels, to form a brake-relieving control signal for controlling said first or second fluid pressure control valve device connected to the wheel cylinder of said one front wheel, and a brake-increasing control signal for increasing the brake fluid pressure by said first or second fluid pressure control valve device after said brake-relieving control signal disappears, is formed on the basis of the brake-increasing output signal of the one of said one front and rear wheels on said same side which has a stronger locking tendency than the other.

2. An apparatus according to claim 1 in which the brake fluid pressure is stepwisely increased during said brake-increasing control signal.

3. An apparatus according to claim 1 in which the duration time of the brake-relieving output signal of said one rear wheel is forcibly shortened to a predetermined time by timer means.

4. An apparatus according to claim 1 in which proportioning valves are arranged between said valve apparatus and said wheel cylinders of the rear wheels.

5. An anti-skid control apparatus according to claim 1 in which said valve apparatus comprises a casing, a piston slidably fitted to said casing, input and output chambers formed at both sides of said piston, input ports communicating with said input chambers, respectively, output ports communicating with said output chambers, respectively, and valve members arranged between said input and output chambers, and operated by said piston, wherein one of said input ports is connected to the wheel cylinder of the right front wheel, one of said output ports which communicates with the one of said output chambers being at the same side as the input chamber communicating said one of the input ports, is connected to the wheel cylinder of the left rear wheel, the other of said input ports is connected to the wheel cylinder of left front wheel, the other of said output ports which communicates with the other of said output chambers being at the same side as the input chamber communicating said other of the input ports, is connected to the wheel cylinder of the right rear wheel.

6. An anti-skid control apparatus according to claim 5 in which a fail detecting switch is engaged with said piston.

7. An apparatus according to claim 1, in which said one of the one front and rear wheels on said same side which has a stronger locking tendency than the other, is equal to the one of said one front and rear wheels from which the brake-relieving output signal has disappeared later than from the other.

8. An apparatus according to claim 1, in which said one of the one front and rear wheels on said same side which has a stronger locking tendency than the other, is equal to the one of said one front and rear wheels from which the brake-relieving output signal has disappeared later than from the other.

9. In an anti-skid control apparatus for a vehicle braking system including:

(A) a pair of front wheels, and a pair of rear wheels in which wheel cylinders are diagonally connected in conduits;

(B) a first fluid pressure control valve device for controlling the brake fluid pressure of the wheel cylinder of one of said front wheels, arranged between a first fluid pressure generating chamber of a tandem master cylinder and said wheel cylinder of the one front wheel;

(C) a second pressure control valve device for controlling the brake fluid pressure of the wheel cylinder of another of said front wheels, arranged between a second fluid pressure generating chamber of said tandem master cylinder and said wheel cylinder of the other front wheel;

(D) a control unit for judging the skid conditions of said front and rear wheels and for generating control signals for controling said first and second fluid pressure control valve devices; and (E) a valve apparatus for generating a fluid pressure in accordance with the lower pressure of the brake fluid pressures of said front wheels controlled with said first and second fluid pressure control valve devices, being arranged between said wheel cylinders of the front wheels and those of the rear wheels; the imprrovements in which a brake relieving output signal for decreasing the brake fluid pressure that is obtained from only one of said rear wheels is ignored, and when the brake-relieving output signals are obtained from both of said rear wheels, the brake-relieving output signal of the one of said rear wheels, which is obtained later than that of the other, is logically combined with the brake-relieving output signal of the one of said front wheels running on the same side as said one of the rear wheels, to form a brake-relieving control signal for controlling said first or second fluid pressure control valve device connected to the wheel cylinder of said one front wheel, and a brake-increasing control signal for increasing the brake fluid pressure by said first or second fluid pressure control valve device, after said brake-relieving control signal disappears is formed on the basis of the brake-increasing output signal of the one of said one front and rear wheels on said same side, the acceleration of which is smaller than the other.

10. An apparatus according to claim 9 in which the brake fluid pressure is stepwisely increased during said brake-increasing control signal.

11. An apparatus according to claim 9 in which the duration time of the brake-relieving output signal of said one rear wheel is forcibly shortened to a predetermined time by timer means.

12. An apparatus according to claim 9 in which proportioning valves are arranged between said valve apparatus and said wheel cylinders of the rear wheels.

13. An anti-skid control apparatus according to claim 9 in which said valve apparatus comprises a casing, a piston slidably fitted to said casing, input and output chambers formed at both sides of said piston, input ports communicating with said input chambers, respectively, output ports communicating with said output chambers, respectively, and valve members arranged between said input and output chambers, and operated by said piston, wherein one of said input ports is connected to the wheel cylinder of the right front wheel, one of said output ports which communicates with the one of said output chambers being at the same side as the input chamber communicating said one of the input ports, is connected to the wheel cylinder of the left rear wheel, the other of said input ports is connected to the wheel cylinder of left front wheel, the other of said output ports which communicates with the other of said output chambers being at the same side as the input chamber communicating said other of the input ports, is connected to the wheel cylinder of the right rear wheel.

14. An anti-skid control apparatus according to claim 13 in which a fail detecting switch is engaged with said piston.

* * * * *

UNITED STATES PATENT AND TRADEMARK OFFICE
CERTIFICATE OF CORRECTION

PATENT NO. : 4,872,729
DATED : October 10, 1989
INVENTOR(S) : Tetsuro Arikawa

It is certified that error appears in the above—identified patent and that said Letters Patent is hereby corrected as shown below:

In The Abstract:

Page 1, line 1, change "anti-ski" to --anti-skid--.

In The Specification:

Column 1, line 45 delete "the right and left sides a road on which" and add --a road on which the right and left sides--.
Column 2, line 46, after "high" add --mu--.
Column 7, line 10, change "Av'" to --AV'--;
 line 17, delete "if";
 line 61, after "the" add --cylindrical member 44, and it--.
Column 9, line 40, after "88a" add --and--;
 line 53, before "94b" add --and--;
 line 53, after "gates" add --90a, 90b,--.
Column 10, line 53, change "chargeover" to --changeover--.
Column 11, line 47, change "e,uns/b/" to --b--;
 line 62, change "hold" to --held--;
 line 66, change "e,uns/b/" to --b--.
Column 12, line 27, change "drown" to --drawn--;
 line 66, change "-e,uns/b/" to --b--.
Column 16, line 28, change "EV2" to --EV2'--.

UNITED STATES PATENT AND TRADEMARK OFFICE
CERTIFICATE OF CORRECTION

PATENT NO.   : 4,872,729
DATED        : October 10, 1989
INVENTOR(S)  : Tetsuro Arikawa It is certified that error appears in the above—identified patent and that said Letters Patent is hereby corrected as shown below:

In The Claims:

Column 18, line 26, change "imprrovements" to
   --improvements--.

Signed and Sealed this

Twenty-sixth Day of May, 1992

Attest:

DOUGLAS B. COMER

*Attesting Officer*       *Acting Commissioner of Patents and Trademarks*